(12) United States Patent
Hanna et al.

(10) Patent No.: US 8,260,008 B2
(45) Date of Patent: Sep. 4, 2012

(54) METHODS FOR PERFORMING BIOMETRIC RECOGNITION OF A HUMAN EYE AND CORROBORATION OF SAME

(75) Inventors: Keith J. Hanna, New York, NY (US); Hector T. Hoyos, New York, NY (US)

(73) Assignee: Eyelock, Inc., Tolima Valley Caguas, PR (US)

( * ) Notice: Subject to any disclaimer, the term of this patent is extended or adjusted under 35 U.S.C. 154(b) by 0 days.

(21) Appl. No.: 12/887,106

(22) Filed: Sep. 21, 2010

(65) Prior Publication Data

US 2011/0007949 A1   Jan. 13, 2011

Related U.S. Application Data

(63) Continuation-in-part of application No. 11/559,381, filed on Nov. 13, 2006, now Pat. No. 7,801,335.

(60) Provisional application No. 60/597,130, filed on Nov. 11, 2005, provisional application No. 60/597,152, filed on Nov. 14, 2005, provisional application No. 60/597,231, filed on Nov. 17, 2005, provisional application No. 60/597,289, filed on Nov. 21, 2005, provisional application No. 60/597,336, filed on Nov. 25, 2005.

(51) Int. Cl.
*G06K 9/00* (2006.01)
(52) U.S. Cl. ........ 382/115; 382/117; 382/118; 382/100; 382/103
(58) Field of Classification Search .................. 382/100, 382/103, 106, 107, 115, 118, 155, 231; 235/380; 340/5.1–5.92; 704/246, 273; 902/3
See application file for complete search history.

(56) References Cited

U.S. PATENT DOCUMENTS

| | | | |
|---|---|---|---|
| 4,641,349 A | 2/1987 | Flom et al. | |
| 5,259,040 A | 11/1993 | Hanna | |
| 5,291,560 A | 3/1994 | Daugman | |
| 5,488,675 A | 1/1996 | Hanna | |
| 5,572,596 A | 11/1996 | Wildes et al. | |
| 5,581,629 A | 12/1996 | Hanna et al. | |

(Continued)

OTHER PUBLICATIONS

B. Galvin, et al., Recovering Motion Fields: An Evaluation of Eight Optical Flow Algorithms, Proc. of the British Machine Vision Conf. (1998).

(Continued)

*Primary Examiner* — Bhavesh Mehta
*Assistant Examiner* — Edward Park
(74) *Attorney, Agent, or Firm* — John D. Lanza; Foley & Lardner LLP

(57) ABSTRACT

A method of biometric recognition is provided. Multiple images of the face or other non-iris image and iris of an individual are acquired. If the multiple images are determined to form an expected sequence of images, the face and iris images are associated together. A single camera preferably acquires both the iris and face images by changing at least one of the zoom, position, or dynamic range of the camera. The dynamic range can be adjusted by at least one of adjusting the gain settings of the camera, adjusting the exposure time, and/or adjusting the illuminator brightness. The expected sequence determination can be made by determining if the accumulated motion vectors of the multiple images is consistent with an expected set of motion vectors and/or ensuring that the iris remains in the field of view of all of the multiple images.

26 Claims, 6 Drawing Sheets

U.S. PATENT DOCUMENTS

| | | | |
|---|---|---|---|
| 5,748,238 A * | 5/1998 | Wakabayashi et al. | 348/373 |
| 6,247,813 B1 | 6/2001 | Kim et al. | |
| 6,714,665 B1 * | 3/2004 | Hanna et al. | 382/117 |
| 6,760,467 B1 | 7/2004 | Min et al. | |
| 7,369,759 B2 * | 5/2008 | Kusakari et al. | 396/18 |
| 7,925,059 B2 | 4/2011 | Hoyos et al. | |
| 2001/0014124 A1 * | 8/2001 | Nishikawa | 375/240.16 |
| 2001/0022815 A1 * | 9/2001 | Agarwal | 375/240.16 |
| 2002/0136435 A1 * | 9/2002 | Prokoski | 382/118 |
| 2003/0163710 A1 | 8/2003 | Ortiz et al. | |
| 2004/0165147 A1 | 8/2004 | Della Vecchia et al. | |
| 2004/0233037 A1 | 11/2004 | Beenau et al. | |
| 2005/0207614 A1 | 9/2005 | Schonberg et al. | |
| 2005/0219360 A1 * | 10/2005 | Cusack et al. | 348/156 |
| 2006/0016872 A1 | 1/2006 | Bonalle et al. | |
| 2006/0088193 A1 | 4/2006 | Muller et al. | |
| 2006/0192868 A1 * | 8/2006 | Wakamori | 348/294 |
| 2006/0274918 A1 | 12/2006 | Amantea et al. | |
| 2006/0274919 A1 | 12/2006 | Loiacono et al. | |
| 2008/0025575 A1 | 1/2008 | Schonberg et al. | |
| 2008/0033301 A1 | 2/2008 | Dellavecchia et al. | |
| 2008/0181467 A1 | 7/2008 | Zappia | |
| 2009/0226053 A1 | 9/2009 | Matsuda et al. | |
| 2010/0046805 A1 | 2/2010 | Connell et al. | |
| 2010/0046808 A1 | 2/2010 | Connell et al. | |

OTHER PUBLICATIONS

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

R. Kumar, et al., Direct recovery of shape from multiple views: a parallax based approach, 12th IAPR Int'l Conf. on Pattern Recognition.

R. P. Wildes, Iris Recognition: An Emerging Biometric Technology, Proc. IEEE 85(9) at pp. 1348-1363 (Sep. 1997).

* cited by examiner

METHODS FOR PERFORMING BIOMETRIC RECOGNITION OF A HUMAN EYE AND CORROBORATION OF SAME

RELATED APPLICATIONS

This is a continuation-in-part of U.S. patent Ser. No. 11/559,381 filed Nov. 13, 2006, and entitled "Apparatus and Methods for Detecting The Presence of a Human Eye", issuing as U.S. Pat. No. 7,801,335 on Sep. 21, 2010, the entirety of which is incorporated by reference herein, which in turn claims the benefits of priority to U.S. provisional patent application No. 60/597,130 filed on Nov. 11, 2005, and U.S. provisional patent No. 60/597,152 filed on Nov. 14, 2005, and U.S. provisional patent No. 60/597,231, filed on Nov. 17, 2005, and U.S. provisional patent No. 60/597,289, filed on Nov. 21, 2005 and U.S. provisional patent No. 60/597,336 filed on Nov. 25, 2005. Each of these is incorporated herein by reference in their entirety.

BACKGROUND OF THE INVENTION

1. Field of the Invention

The invention relates generally to systems in which imagery is acquired primarily to determine or verify the identity of a person using a biometric recognition system, and more specifically to systems in which there is a need to detect the presence of a live, human eye in the imagery. The biometric used for recognition may be the iris, for example.

2. Description of Related Art

Like a fingerprint, an iris can be used to uniquely identify a person. A number of systems have been implemented for this purpose. For one example, U.S. Pat. No. 4,641,349, titled "Iris Recognition System," issued to Flom et al. on Feb. 3, 1987, and U.S. Pat. No. 5,291,560, titled "Biometric Personal Identification Based on Iris Analysis," issued to Daugman on Mar. 1, 1994, discloses a system for identifying a person based upon unique characteristics of the iris. A camera captures an image of the iris, the iris is segmented, and then the iris portion is normalized to compensate for pupil dilation. The normalized iris features are then compared with previously stored image information to determine whether the iris matches.

For another example, U.S. Pat. No. 5,572,596, titled "Automated, Non-Invasive Iris Recognition System and Method," issued to Wildes et al. on Nov. 5, 1996, discloses an alternate method of performing iris recognition using normalized correlation as a match measure. Further advantages and methods are set forth in detail in this patent.

For another example, U.S. Pat. No. 6,247,813, titled "Iris Identification System and Method of Identifying a Person through Iris Recognition," issued to Kim et al. on Jun. 19, 2001, discloses another system used for iris recognition, which implements a unique identification methods. The system divides a captured image of an iris into segments and applies a frequency transformation. Further details of this method are set forth in the patent.

For yet another example, U.S. Pat. No. 6,714,665, titled "Fully Automated Iris Recognition Systems Utilizing Wide and Narrow Fields of View," issued to Hanna et al. on Mar. 30, 2004, discloses a system designed to automatically capture and identify a person's iris. This system uses a camera with a wide field of view to identify a person and a candidate iris. Once identified, a second camera with a narrow field of view is focused on the iris and an image captured for iris recognition. Further details of this method are set forth in the patent.

One problem faced by iris recognition systems involves the possibility of spoofing. Specifically, a life-sized, high-resolution photograph of a person may be presented to an iris recognition system. The iris recognition systems may capture an image of this photograph and generate a positive identification. This type of spoofing presents an obvious security concerns for the implementation of an iris recognition system. One method of addressing this problem has been to shine a light onto the eye, then increase or decrease the intensity of the light. A live, human eye will respond by dilating the pupil. This dilation is used to determine whether the iris presented for recognition is a live, human eye or merely a photograph—since the size of a pupil on a photograph obviously will not change in response to changes in the intensity of light. One disadvantage of this type of system involves the time required to obtain and process data as well as the irritation a person may feel in response to having a light of varying intensity shone into their eye.

U.S. Pat. No. 6,760,467, titled "Falsification Discrimination Method for Iris Recognition System," issued to Min et al. on Jul. 6, 2004, attempts to address this problem. This system positions a pair of LED's on opposite sides of a camera. These LED's are individually lighted and images captured through a camera. These images are analyzed to determine whether light from the LED's was reflected back in a manner consistent with a human eye. Because a flat photograph will not reflect light back in the same manner, this system aims to deter this type of spoofing. One disadvantage of this system, involves the simplicity of the approach and the placement of the LED's. With two LED's positioned at a fixed, known location, the method can be defeated by appropriate placement of two small illuminators in an iris image. Also, while this system may operate more quickly than systems that dilate a pupil, it still requires time to capture at least two separate images: one when each of the two LED's are individually lit. Further, a third image needs to be captured if the system requires both LED's to be illuminated to capture imagery that is sufficiently illuminated for recognition.

The above identified patents are each incorporated herein by reference in their entirety as well as each of the patents and publications identified below.

As mentioned above, it is well known that imagery of the iris can be reliably matched to previously recorded iris imagery in order to perform reliable verification or recognition. For example, see Daugman J (2003) "The importance of being random: Statistical principles of iris recognition." *Pattern Recognition*, vol. 36, no. 2, pp 279-291. However since the iris patterns are not easily recognizable to a human, it is impossible to demonstrate to a user who has been rejected from any iris recognition system the reason for the rejection. On the other hand, if a face image of the person whose iris has been used for recognition is acquired, it is easy to demonstrate the reason for rejection since face imagery can be easily interpreted by humans. Therefore, especially in unattended systems, there is a need for a highly secure method of associating an acquired face image to an acquired iris image, preferably (although not necessarily) with just one sensor in order to reduce cost and size of the solution.

SUMMARY OF THE INVENTION

This summary is provided solely to introduce a more detailed description of the invention as shown in the drawings and explained below.

Apparatus and methods for detecting a human iris use a computer screen on which an image is presented. The image is reflected off of a person's eye. The reflection is analyzed to determine whether changes to the reflected image are consistent with a human eye.

According to one aspect of the invention, a human eye is detected by presenting a first image on a computer screen that is oriented to face a user. At least one camera (and in some preferred embodiments at least two cameras) is positioned near the computer screen and oriented to face the user so that light emitted by the computer screen as the first image is reflected by the user and captured by the camera as a second image. The camera may be attached as part of the computer screen or separately mounted. A computer is operably coupled with the computer screen and the camera and the computer detects a human eye when at least a portion of the second image includes a representation of the first image on the computer screen reflected by a curved surface consistent with a human eye. The computer may be operated locally or operated remotely and connected through a network.

According to further aspects of the invention, the human eye is detected when the representation of the first image included in the second image is approximately equal to a human-eye magnification level, which is determined by dividing 3 to 6 millimeters by a distance from the computer screen to the user. For an implementation where the user is at least 100 millimeters from the computer screen, the representation of the first image is at least ten times smaller than the first image. For an implementation where the user is approximately 75 to 500 millimeters from the computer screen and the camera, the representation of the first image is approximately 12.5 to 166.7 times smaller than the first image. The determination can further require that the magnification at the center of the representation is smaller than a magnification in areas surrounding the center of the representation. Likewise, the determination can detect a human eye when the second image includes the representation of the first image on the computer screen reflected by an ellipsoidal surface with an eccentricity of approximately 0.5 and a radius of curvature at the apex of the surface of approximately 7.8 millimeters.

According to further aspects of the invention, the portion of the second image containing a representation is isolated. The comparison is made between the first image and the portion of the second image containing the human iris. In addition or alternatively, the determination can be made by searching the second image for a warped version of the first image. For example, a checkered pattern may be presented on the computer screen. The second image is then searched for a warped version of the checkered pattern.

According to further aspects of the invention, a third image is presented on the computer screen that is different than the first image. For example, the first image may be a checkered pattern and the third image may also be a checkered pattern but with a different arrangement of checkered squares. A fourth image is captured through the camera(s). The computer then aligns the second and fourth image. The computer then determines a difference image representing the difference between the second image and the fourth image. The portion of the difference containing an eye, and thus containing a reflection of the first and the third image are isolated. This may be found by identifying the portion of the difference image containing the greatest difference between the second and fourth images. A human eye is detected when the portion of the difference image is consistent with a reflection formed by a curved surface. For example, this can be detected determining the size of the portion containing a reflection of the first and third images; where the ratio between the image size and the image reflection size is greater than 10 to 1 then a human eye is detected. This ratio can be calculated for a particular application by dividing the distance between the user and the computer screen by approximately 3 to 6 millimeters, where the camera is at or near the computer screen.

According to still further aspects of the invention, a skin area is found in the second image and a determination is made as to whether the reflection of light from the skin area is consistent with human skin.

According to another aspect of the invention, a human eye is detected by presenting a first image on a computer screen positioned in front of a user. A first reflection of the first image off of the user is captured through a camera. The computer screen presents a second image on the computer screen positioned in front of the user. The camera captures a second reflection of the second image off of the user. The first and second images can be, for example, a checkered pattern of colors where the second image has a different or inverted arrangement. A computer compares the first reflection of the first image with the second reflection of the second image to determine whether the first reflection and the second reflection were formed by a curved surface consistent with a human eye. This comparison can be made, for example, by aligning the first reflection and the second reflection then calculating a difference between them to provide a difference image. The portion of the difference image containing a difference between a reflection of the first image and a reflection of the second image is identified. The size of this portion is determined. A human eye is detected when the ratio of the size of this portion to the size of the first and second image is approximately equal to a human-eye magnification level. Where the camera is located at or near the computer screen, the human-eye magnification level is determined by dividing the distance from the computer screen to the user by approximately 3 to 6 millimeters.

According to another aspect of the invention, a human eye is detected by obtaining a first image of a user positioned in front of a computer screen from a first perspective and obtaining a second image of the user positioned in front of the computer screen from a second perspective. A computer identifies a first portion of the first image and a second portion of the second image containing a representation of a human eye. The computer detects a human eye when the first portion of the first image differs from the second portion of the second image. For example, the computer may detect changes in specularity consistent with a human eye. For another example, the computer may align the first image with the second image and detect an area of residual misalignment. In this case, a human eye is detected if this area of residual misalignment exceeds a predetermined threshold.

According to further aspects of the invention, the first perspective is obtained by presenting a first graphic on the computer screen at a first location and instructing the user to view the first image. The second perspective is obtained by presenting a second graphic on the computer screen at a second location, different than the first, and instructing the user to view the second image.

According to another aspect of the invention, a human eye is detected by presenting one or more illuminators oriented to face a user. At least one camera is positioned proximate the illuminators. The camera(s) is oriented to face the user so that light emitted by the illuminators is reflected by the user and captured by the camera(s). The camera(s) also obtain a second image through at a different time than the first image. A computer detects a first position of a reflection in the first image and a second position of a reflection in the second image. The computer normalizes any positional change of the user in the first image and the second image based upon the first position and the second position. This normalizing includes compensating for motion during the time between the first image and the second image by using at least a translation motion model to detect residual motion of the position of the reflection. A human eye is detected when a change between the first image and the second image is consistent with reflection by a curved surface consistent with that of a human eye.

In another aspect of the invention, the invention includes a method of biometric recognition that associates face and iris imagery so that it is known that the face and iris images are derived from the same person. The methodology allows face acquisition (or recognition) and iris recognition to be associated together with high confidence using only consumer-level image acquisition devices.

In general, the inventive method of biometric recognition that associates face and iris imagery includes a method of biometric recognition. Multiple images of the face and iris of an individual are acquired, and it is determined if the multiple images form an expected sequence of images. If the multiple images are determined to form an expected sequence, the face and iris images are associated together. If the face and iris images are associated together, at least one of the iris images is compared to a stored iris image in a database. Preferably, the iris image comparison is performed automatically by a computer. Additionally or in the alternative, if the face and iris images are associated together, at least one of the face images is compared to a stored face image in a database. Preferably, the face image comparison is performed manually by a human.

Preferably, the acquiring of both face and iris images is performed by a single sensing device. That single sensing device is preferably a camera that takes multiple images of a person's face. Optionally, a midpoint of the camera's dynamic range is changed while taking the multiple images of the person's face. In addition or in the alternative, the position of the user relative to the camera is changed while taking the multiple images of the person's face. In addition or in the alternative, the zoom of the camera is changed while taking the multiple images of the person's face. Preferably, the acquiring of images occurs at a frame rate of at least 0.5 Hz.

To prevent fraudulent usage of the system (e.g., a person inserting a photo of someone else's iris into the field of view), at least one imaging parameter is determined from the multiple images acquired, and the at least one imaging parameter determined from the multiple images is compared to at least one predetermined expected imaging parameter. If the at least one imaging parameter determined from the multiple images is significantly different from the at least one predetermined expected imaging parameter, then it is determined that the multiple images do not form an expected sequence. Regarding the at least one imaging parameter, it may include at least one of determining if the accumulated motion vectors of the multiple images is consistent with an expected set of motion vectors; or ensuring that the iris remains in the field of view of all of the multiple images. This preferably takes places at substantially the same time as the acquiring step. If it is detected that at least one of i) inconsistent accumulated motion vectors or ii) that the iris is not in the field of view of all of the multiple images, then an error message is generated and the acquisition of images ceases and is optionally reset.

Because the face and the iris have very different reflectivity properties, the imaging device that captures both face and iris images must be adjusted accordingly. As such, preferably, the sensitivity of the camera is altered between a first more sensitive setting for acquiring iris images and a second less sensitive setting for acquiring face images. For example, the altering of the sensitivity may include alternating back and forth between the first and second settings during the acquiring step. This alternating step may be performed for every image so that every other image is acquired under substantially the same first or second setting. Whatever the timing of the altering of the sensitivity of the camera may be, how the altering may be accomplished may include at least one of the following: adjusting the gain settings of the camera; adjusting the exposure time; or adjusting the illuminator brightness. Preferably, the first more sensitive setting is substantially in a range of 1 to 8 times more sensitive than the second less sensitive setting.

Preferably, the acquiring step of the inventive method is performed until at least one face image suitable for human recognition is acquired and at least one iris image suitable for computer recognition is acquired. The acquisition of the at least one suitable face image is preferably required to occur within a predetermined amount of time of the acquisition of the at least one suitable iris image, either before or afterwards.

More generally, the inventive method of biometric recognition includes the steps of acquiring at least one non-iris image suitable for human recognition, and acquiring at least one iris image suitable for computer recognition within a predetermined period of time from the non-iris image acquiring step to ensure that both suitable images are from the same person. The non-iris image includes at least one of a body image, a face image, an identification code image, or a location image.

BRIEF DESCRIPTION OF THE DRAWINGS

Embodiments of the present invention are illustrated by way of example, and not by way of limitation, in the figures and accompanying drawings and in which like reference numerals refer to similar elements and in which.

DETAILED DESCRIPTION OF THE INVENTION

Figure 1:
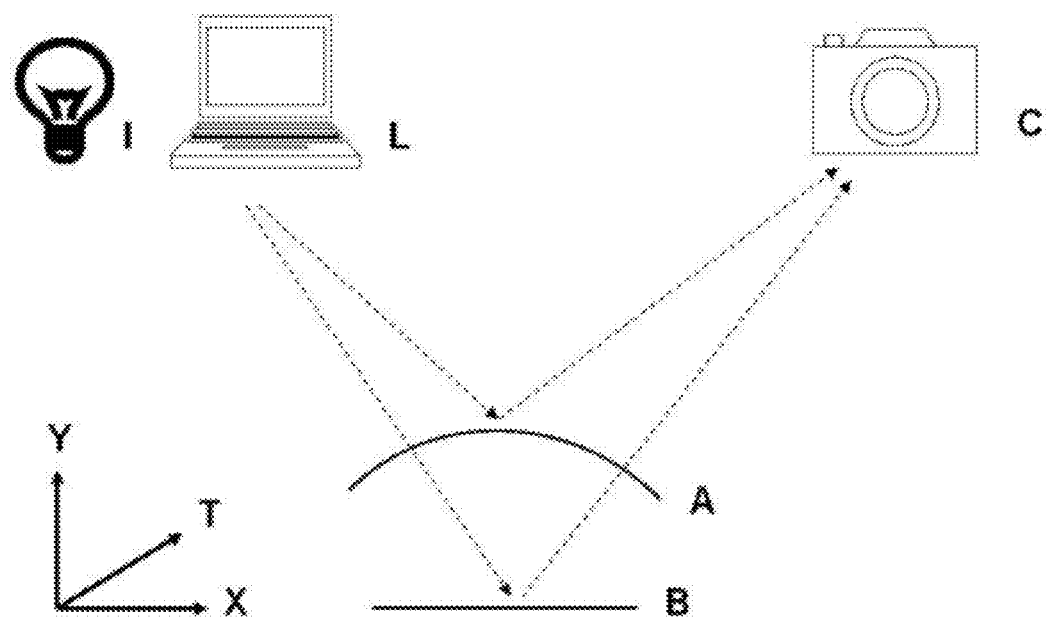
FIG. 1 is a functional block diagram of one preferred system used to detect a human eye.

In the following description, for the purposes of explanation, numerous specific details are set forth in order to provide a thorough understanding of the embodiments of invention described herein. It will be apparent, however, that embodiments of the invention may be practiced without these specific details. In other instances, well-known structures and devices are shown in block diagram form in order to avoid unnecessarily obscuring the description of embodiments of the invention. It should also be noted that these drawings are merely exemplary in nature and in no way serve to limit the scope of the invention, which is defined by the claims appearing hereinbelow.

Functional Overview

In iris recognition applications, the iris is imaged behind the transparent corneal surface which has a particular convex shape. Light is also typically reflected off the cornea itself and back into the imager. In addition, the retinal surface is imaged through the pupil although it typically appears dark due to the relatively small amount of light that is returned to the imager from it. In order to determine whether a detected iris is live, parameters of the geometrical and/or photometric relationships and/or properties of the iris, retina and cornea determined. The reflective properties of a human eye are detailed at length in "The World in an Eye," published by Ko Nishino and Shree K. Nayar, in *IEEE Conference on Pattern Recognition*, Vol 1, pp 444-451, June 2004, which is incorporated by reference in its entirety. In the present invention, using these reflective parameters, a determination is made as to whether an eye is live or not. Following the methods disclosed below, various components and their configuration in an iris recognition system can be varied in order to optimize performance for specific applications where it is easier to modify some configuration parameters compared to others.

More specifically, preferred techniques are discussed for determining whether an image detected through a camera is a live, human eye or a false representation such as a photograph. One or more images are presented on a computer screen positioned in front of a user. To deter attempts at spoofing, the image used for this determination may vary. Images presented on the computer screen may include a solid color, a regular or warped checkered pattern, random noise, etc. In addition, a number of different images may be presented in quick succession so that a person is unable to tell which image is being used for this determination, and is unable to predict which image will be displayed at which time. One or more cameras are positioned near the computer. The cameras are positioned to face a person in front of the computer screen. Due to the relatively sharp curvature of the human eye and particularly the cornea, the image projected on the computer screen will be reflected back and captured by the cameras.

The captured image may then be analyzed to determine whether it is consistent with an image reflected by a human eye. A number of methods may be used for this purpose. For example, the image reflected by the cornea and captured by the camera will appear substantially smaller than the image presented on the computer screen. A threshold level of magnification is set based upon the distance to the person's eye and the average radius of curvature for a human eye. If the captured image contains a reflection of the image presented on the computer screen and it is consistent in size with the expected size of this reflection, a human eye will be detected. This deters spoofing with a photograph because the flat surface of a photograph will not provide the substantial reduction in size caused by a reflection off the surface of the cornea. A number of other methods and variations can be used to make this same determination. These are explained in further detail below.

Configuration

FIG. 1 shows one preferred configuration of components. The cornea A is shown schematically as a curved surface. The iris B is shown schematically as a flat surface behind cornea A. For purposes of modeling a human eye, the surface shown as iris B could also represent the retinal surface. The cornea A and iris B are illuminated by one or more light sources I. In addition, a computer L includes a screen facing a user. The screen projects an image that may change with time. For example, the screen may project different wavelengths of light, each illuminating at different time instants. The illumination from items I and L are reflected off the cornea and directed into one or more cameras or imagers C. Illumination from the light sources I and the computer L are transmitted through the cornea, reflected off the iris or retina, re-transmitted through the cornea into the imager C. Since the cornea is transparent, imager C captures an image of the iris or retina and also has an image of the illumination I or projected image from computer L superimposed on top of it.

A human eye is identified by capturing image data using a particular configuration of a set of components such as those shown in FIG. 1, and to compare the captured image data with data that has been predicted using knowledge of the expected geometrical or photometric configuration of the components. More specifically, two preferred comparison methods are described.

In the first method, imagery is captured using at least two different geometrical or photometric configurations of components. The captured image data (or features derived from the data) acquired using one configuration is then compared to the captured image data or derived features acquired using the second or further configurations. The computer calculates a set of change parameters that characterize the difference between the captured image data. The set of change parameters is compared with those change parameters that are predicted using knowledge of the expected change in geometrical or photometric configuration of the components. If the measured change parameters are different from the expected change parameters, then the geometric or photometric configuration of the corneal and iris or retinal surfaces are not as expected, for example the iris and cornea may appear to lie on the same surface. In this case it can be inferred that the iris is not live. Similarly, if the corneal surface is not consistent with a partially spherical surface, then again it is known that an iris is not live.

In another preferred method, imagery is captured using one geometric or photometric configuration of components. The captured image data (or features derived from the data) is compared with data that is predicted using absolute knowledge of the expected geometrical or photometric configuration of the components. For example, for a given image projected on the screen of the computer, a particular illumination pattern would be expected to appear on the surface of the cornea. While these two methods are described separately, they can be combined.

Method Comparing Two Configurations

Introduction

With reference to FIG. 1, consider a fixed geometry between a candidate iris B and a candidate cornea A, then changes in the geometrical arrangement and/or photometric properties of the illumination I or projected image L or position of camera C or position of the iris or corneal surfaces in coordinate system X,Y,T, where X,Y represent a standard 3D coordinate system and T represents time, results in change in the displacement or characteristics between or within the image of the iris B (or retina), and the image reflected off the cornea A. As shown, the screen of computer L can project a graphical image onto the curved surface of the cornea A. For example, one or more illuminators can illuminate the cornea and iris. Two cameras placed at two slightly different locations then image the iris B and cornea A. Due to the distance between the iris and the corneal surface, the specular reflection of the illuminator or graphical illumination on the cornea appears in a different location and can be warped or shifted with respect to the iris image in each camera view due to standard parallax and also the 3D curvature of the corneal surface, which acts similarly to a convex minor lens due to its high curvature and reflectivity. This displacement or parallax can be measured and used to determine whether an eye has 3D structure that is consistent with the curvature of the cornea.

Figure 2:
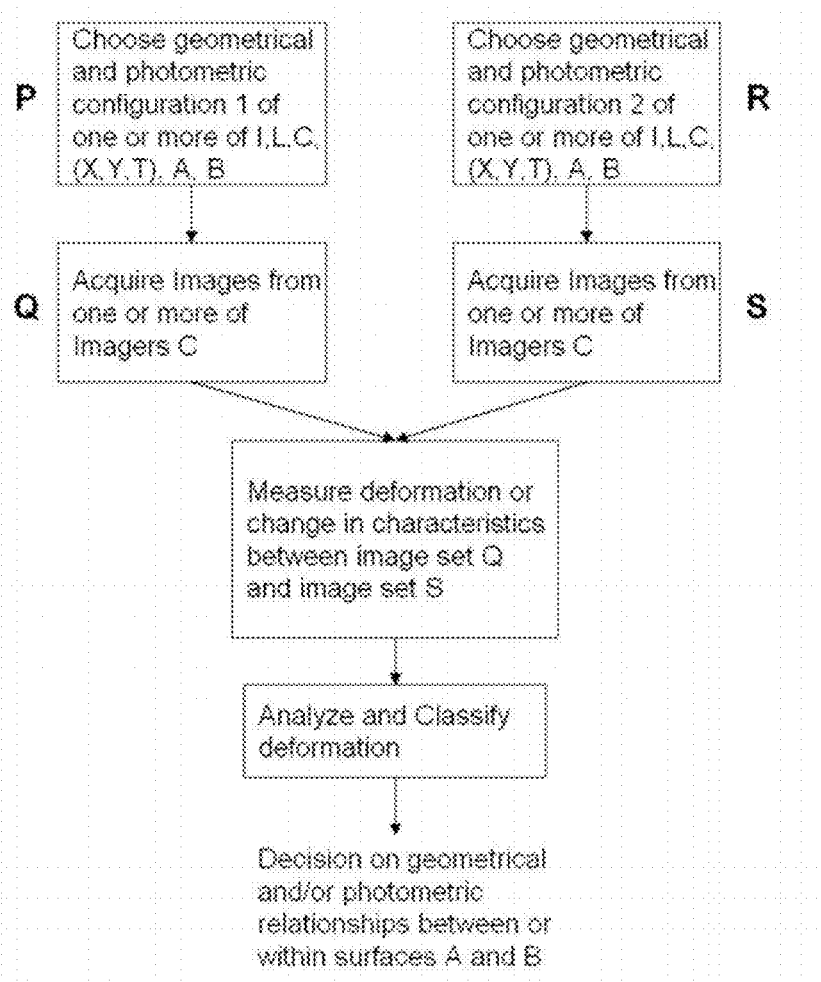
FIG. 2 is a flow chart showing one preferred method of detecting a human eye.

This process is further shown in FIG. 2, which can be implemented using several methods. For example, one preferred method is shown in R. Kumar, P. Anandan, and K. J. Hanna, "Direct Recovery of Shape from Multiple Views: a Parallax Based Approach," Proceedings of the 12th IAPR International Conference on Pattern Recognition, vol. 1, pp. 685-688, 1994, which is incorporated by reference in its entirety. The method shows how multiple images of a 3D scene can be processed to recover the 3D structure of a scene. In the first step, the multiple images are aligned together assuming a 3D planar model. For example, in the case of iris imagery, the 3D plane may be the iris surface itself. After this 3D planar alignment, any residual misalignment is indicative of structure that does not lie on the 3D plane. In the second step, this residual misalignment is measured.

In another method of measuring 3D structure, a full model of the scene is recovered without a 3D planar assumption. This type of method is disclosed in U.S. Pat. No. 5,259,040, titled "Method for determining sensor motion and scene structure and image processing system thereof," which is incorporated herein by reference in its entirety. Notwithstanding that a specularity is not a real structure but an image artifact, its position in the image changes with viewpoint and therefore is detected by measuring the residual misalignment. If there is significant misalignment, as measured by thresholding the residual misalignment, then there is an indication that a 3D structure is present. Methods for thresholding residual misalignments are well-known and an example is given in "Recovering Motion Mields: An Evaluation of Eight Optical Flow Algorithms" B. Galvin, B. McCane, K. Novins, D. Mason, S. Mills, Proceedings of the British Machine Vision Converence (BMVC), 1998, which is incorporated herein by reference in its entirety. Given the corneal curvature, there is not only a residual misalignment, but the magnitude and distribution of the residual misalignment across the image is consistent with the 3D structure of the cornea. An example of modeling the reflected image off a curved surface is given in "Omnidirectional Vision," by Shree Nayar, British Machine Vision Conference, 1998, which is incorporated herein by reference in its entirety. Another example of modeling the reflected image off the cornea is "The World in an Eye," published by Ko Nishino and Shree K. Nayar, in IEEE Conference on Pattern Recognition, Vol 1, pp 444-451, June 2004, which is incorporated herein by reference in its entirety. In this latter case a camera observes imagery reflected off the cornea that is modeled as an ellipsoid. It is shown how the deformation introduced by the ellipsoid can be removed in order to provide a standardized perspective image. This standardized perspective image can then be processed using standard 3D structure recovery algorithms, as described earlier in this specification. Parameters for the shape of the cornea are well known. For example, the Gullstrand-LeGrand Eye model notes that the radius of the cornea is approximately 6.5 mm-7.8 mm. In another example, in "Adler's Physiology of the Eye: Clinical Application," Kaufman and Alm editors, published by Mosby, 2003, the radius of curvature at the apex of the cornea is noted to be approximately 7.8 mm and the eccentricity of the ellipsoid is approximately 0.5. The same model that removes the deformation introduced by the corneal surface can be used in reverse in order to introduce the expected deformation into a standard geometrical pattern (such as a checkerboard) that can be presented onto the screen. When this deformed image is reflected off the cornea, it is substantially non-deformed so that the image acquired by the camera is simply the standard geometrical pattern. This simplifies the image processing methods that are required for detecting the patterns in the acquired imagery.

In another example implementation, the illumination screen or device can be located close to one of the cameras. The reflection off the retinal surface appears brighter in the camera located closer to the imager due to the semi-mirrored surface of the retina, and this also indicates whether an eye has the appropriate geometric and photometric properties. This approach takes advantage of the "red-eye-effect" whereby a light source is reflected off the retina and directly into the camera lens. If a second light source is placed at a more obtuse angle to the eye and camera, then less light will be reflected off the retina, although a similar quantity of light will be reflected off the face and other surfaces of the scene that scatter light in all directions (such a surface is Lambertian). Lambertian reflectance is described in Horn, "Robot Vision," MIT Press, pp. 214-315, which is incorporated herein by reference in its entirety.

Further methods that exploit configuration changes are described below. The methods are separated into two steps: (1) illumination control and image acquisition; and (2) measuring deformation or change in characteristics. Further examples of these two steps are now described.

Illumination Control and Image Acquisition:

In steps P and Q in FIG. 2, images are acquired using a particular configuration of the candidate cornea A and iris B (or retina), the illumination from light source I and/or the screen on computer L, one or more imagers C and/or orientation or position X,Y of the candidate corneal and iris or retinal surfaces at a time T. In steps R and S, images are acquired using a different configuration of the same elements also at a time T. An example of how a different orientation X,Y is obtained is by imaging the candidate person at two or more locations as the person walks or moves through a space. Steps (P,Q) and (R,S) may occur sequentially (T is different in this case) or simultaneously (T is equal in this case). An example of a sequential method is to use a single camera C but to modify the geometric or photometric arrangement of the light source I or image projected on the screen of computer L. By projecting an image having a geometrical pattern, the overall security of the system is dramatically improved because the geometrical pattern can be varied randomly under computer control, and because a geometrical pattern reflected by an eye is more difficult to spoof than a simple point source of light.

Another example of the sequential method is to create a projected image that varies over time—a video sequence for example. The video sequence may comprise a checkerboard pattern. For example, an example projection may have 4×4 black or white squares shown on the screen in a random binary arrangement. The squares may be pre-deformed as described above so that the reflected image off the cornea is close to a perfect checkerboard pattern.

Another example of a sequential method takes advantage of any combined motion of the cornea A and iris or retinal surfaces B. As the candidate cornea and iris or retina move through 3D space over time, different images are acquired at different time periods and due to the self-motion of the surfaces, the geometry between the said components changes. An example of a simultaneous method is to keep the image or light source fixed, but to have two cameras that acquire images from slightly different locations.

Measuring Deformation or Change in Characteristics

The images captured from steps Q and S in FIG. 2 are then sent to a module that measures the deformation or changes in characteristics between the image content due to reflection off the corneal surface and image content due to reflection off the iris or retina. There are many different methods for performing this step. In one preferred implementation, image alignment is performed using a hierarchical, iterative method such as described by Bergen et al., "Hierarchical Model-Based Motion-Estimation," European Conference on Computer Vision, 1993, which is incorporated herein by reference in its entirety. For example, a translation model can be applied between the warped images W(Q) and the original images O(R). There are, of course, many other methods for performing alignment. A difference between the aligned images is then calculated. The aligned images are then filtered to enhance fine-frequency edges due to the checkerboard patterns and to reduce the magnitude of low frequency edges that may occur due to illumination changes elsewhere in the image. There are also many ways of filtering images in this way. One preferred example is described in "A Computational Approach to Edge Detection," by John Canny, IEEE Transactions on Pattern Analysis and Machine Intelligence, Volume 8, Issue 6, 1986, which is incorporated herein by reference in its entirety. An image difference is then calculated between the aligned filtered images to further remove illumination changes and to highlight the difference between the first reflected filtered image and the second reflected filtered image. Next, template matching is performed to identify the unique pattern created by taking the difference of the filtered, reflected images. If such a pattern is located in the image of the correct size and correct deformation, then a live reflection off the cornea has been detected. There are many methods for detecting patterns in images. One preferred example is disclosed in U.S. Pat. No. 5,488,675, titled "Stabilizing Estimate of Location of Target Region Inferred from Tracked Multiple Landmark Regions of a Video Image," and also U.S. Pat. No. 5,581,629, titled "Method for Estimating the Location of an Image Target Region from Tracked Multiple Image Landmark Regions," both of which are incorporated herein by reference in their entirety.

The size of the pattern can also be predicted from the expected geometrical shape of the cornea. The detected size of the reflection can then be measured and used to determine whether the size is consistent with that of a human cornea. For example, it is known that the focal length of a convex minor reflector is half the radius of curvature. Using standard lens equations, then $1/f=1/d0+1/d1$, where f is the focal length, d0 is the distance of the screen from the cornea, and d1 is the distance of the reflected virtual image from the cornea. It is known from, for example, "Adler's Physiology of the Eye: Clinical Application," Kaufman and Alm editors, published by Mosby, 2003, that the radius of curvature at the apex of the cornea is approximately 7.8 mm and the eccentricity of the ellipsoid shape of the cornea is approximately 0.5. The focal length of the corneal reflective surface at the apex is therefore half this focal length: approximately 3.9 mm. Using the ellipsoidal model, the radius of curvature of the cornea at a radial distance of 6 mm from the apex of the cornea can be computed to be approximately 9.6 mm. The focal length of the corneal reflective surface in this region is therefore approximately 4.8 mm. If the cornea is situated approximately 150 mm from the computer screen, then from the standard lens equation above, d1 can be computed to be 4.0 mm at the apex, and 4.96 mm at a radial distance of 6 mm from the apex of the cornea. The magnification is computed to be $d1/d0=4.0/150=1/37.46$ at the apex of the cornea, and $4.96/150=1/30.25$ at a radial distance of 6 mm from the apex of the cornea. This means that the cornea has the effect of reducing the size of the graphic on the computer screen by a factor of 37.46 to 30.25 in this case, over different regions of the cornea, whereas the magnification expected if the reflective surface is flat is 1. If the detected graphic is significantly larger or smaller than the reduction factors 37.46 to 30.25, then the curvature of the cornea is inconsistent with that of a live person.

If the local radius of curvature of the cornea is substantially less then the distance of the cornea to the computer screen, then the magnification can be simplified to be $R/(2\times d1)$, where d1 is the distance from the cornea to the computer screen and R is the local radius of curvature of the cornea. Due to human variation, the radius of curvature of local regions of a cornea may lie within the bounds of 6 to 12 mm. The magnification therefore may lie in the range of 3/d1 to 6/d1.

In another example, if d1 lies within the range of 75 to 500 mm then using the parameters and the formula above, it is expected that the magnification is 1/12.5 to 1/166.7.

The distance d1 may be unknown, however, the ratio of the magnification at the apex of the cornea and the magnification elsewhere in the cornea is independent of the distance d1. For example, using the parameters above, the magnification ratio between the apex and a point 6 mm radially from the apex is $(1/37.46)/(1/30.25)=0.807$. At a distance of 4 mm radially from the apex, the expected magnification ratio is computed to be 0.909. The iris is approximately 11 mm in diameter, and therefore localization of the iris/sclera boundary can be used to identify the approximate location of any radial position of the cornea with respect to the apex.

In another example, consider the change in configuration caused by the movement of a person with respect to a camera and one or more illuminators or computer screens. The position of the reflection of the illuminators, or the detected shape and magnification of the computer screen, will change as the person moves. In one preferred implementation to detect this change, a sequence of images are acquired and image alignment is performed using a hierarchical, iterative method such as described by Bergen et al., "Hierarchical Model-Based Motion-Estimation," European Conference on Computer Vision, 1993, which is incorporated herein by reference in its entirety. For example, a translation and zoom model can be applied between the warped images W(Q) and the original images O(R). In this case the motion of the user will be stabilized, and, for example, the image of the iris may be aligned throughout the sequence. Any residual motion is an indication of a change in the position of the reflection of the illuminators, or of a change in the shape and magnification of the computer screen, due to an eye consistent with that of a live person. For example, one preferred method of detecting the residual motion or change is shown in R. Kumar, P. Anandan, and K. J. Hanna, "Direct Recovery of Shape from Multiple Views: a Parallax Based Approach," Proceedings of the 12th IAPR International Conference on Pattern Recognition, vol. 1, pp. 685-688, 1994, which is incorporated by reference in its entirety. In an alternate method, a non-parametric flow model as described in Bergen et al., "Hierarchical Model-Based Motion-Estimation," European Conference on Computer Vision, 1993, can be applied to detect residual motion.

In another example, consider the presentation of illumination of a particular wavelength, the recording of an image, and then presentation of illumination with a different wavelength and the recording of one or more additional images. Depending on the photometric properties of the material, the ratio of the digitized intensities between the images can be computed and compared to an expected ratio that has been previously documented for that material. The response of iris tissue has a unique photometric signature which can indicate whether the iris is live or not. Equally, the response of skin tissue has a unique photometric signature which can indicate whether the skin is live or not. This method can be implemented by acquiring two or more images with the computer screen projecting different wavelengths of light, such as red, green, and blue. These colors can be projected in a checkerboard or other pattern. For example, a first image may contain a red checkerboard pattern, and a second image may contain a blue checkerboard pattern. The methods described above can then be used to align the images together, and to detect the location of the eye or eyes by detecting the patterns reflected off the cornea. The iris and the sclera (the white area around the iris) are then detected. Many methods are known for detecting the iris and the sclera. For example, a Hough transform can be used to detect the circular contours of the pupil/iris and iris/sclera boundaries as explained by R. Wildes, "Iris Recognition: An Emerging Biometric Technology," Proc IEEE, 85(9): 1348-1363, September 1997, which is incorporated herein by reference in its entirety. Intensities of the iris and sclera can then be sampled and used to measure the liveness of the eye. These ratios can be computed in several ways. In one preferred method, the ratio of the iris reflectance and the scleral reflectance is computed. This ratio is substantially independent of the brightness of the original illumination. The iris/scleral ratio is then computed on the other aligned images. This process can be repeated by measuring the scleral/skin ratio. The skin region can be detected by measuring intensities directly under the detect eye position, for example. Ratios can also be computed directly between corresponding aligned image regions captured under different illumination wavelengths. These ratios are then compared to pre-stored ratios that have been measured on a range of individuals. One method of comparison is to normalize the set of ratios such that sum of the magnitudes of the ratios is unity. The difference between each normalized ratio and the pre-stored value is then computed. If one or more of the normalized ratios is different from the pre-stored ratio by more than a pre-defined threshold ratio, then the measured intensity values are inconsistent with those of a real eye.

In yet another example, the user may be asked to fixate on two or more different locations on the computer screen while a single camera records two or more images. The specular reflection off the cornea will remain substantially in the same place since the cornea is substantially circular, but the iris will appear to move from side to side in the imagery. In order to detect this phenomenon, the alignment methods described above can be used to align the images acquired when the user is looking in the first and second directions. The high-frequency filtering methods and the image differencing method described above can then be used to identify the eye regions. The alignment process can be repeated solely in the eye regions in order to align the iris imagery. The residual misalignment of the specular image can then be detected using the methods described earlier.

Method Comparing One Configuration

Introduction

In the previous section, images were captured using at least two different geometrical or photometric configurations of components. The captured image data (or features derived from the data) acquired using each configuration were compared to each other and a set of change parameters between the captured image data were computed. The set of change parameters were then compared with those change parameters that were predicted using knowledge of the expected change in geometrical or photometric configuration of the components. In a second method, imagery is captured using one geometric or photometric configuration of components. The captured image data (or features derived from the data) is compared with data that is predicted using absolute knowledge of the expected geometrical or photometric configuration of the components. Both the first and second methods can optionally be combined.

Figure 3:
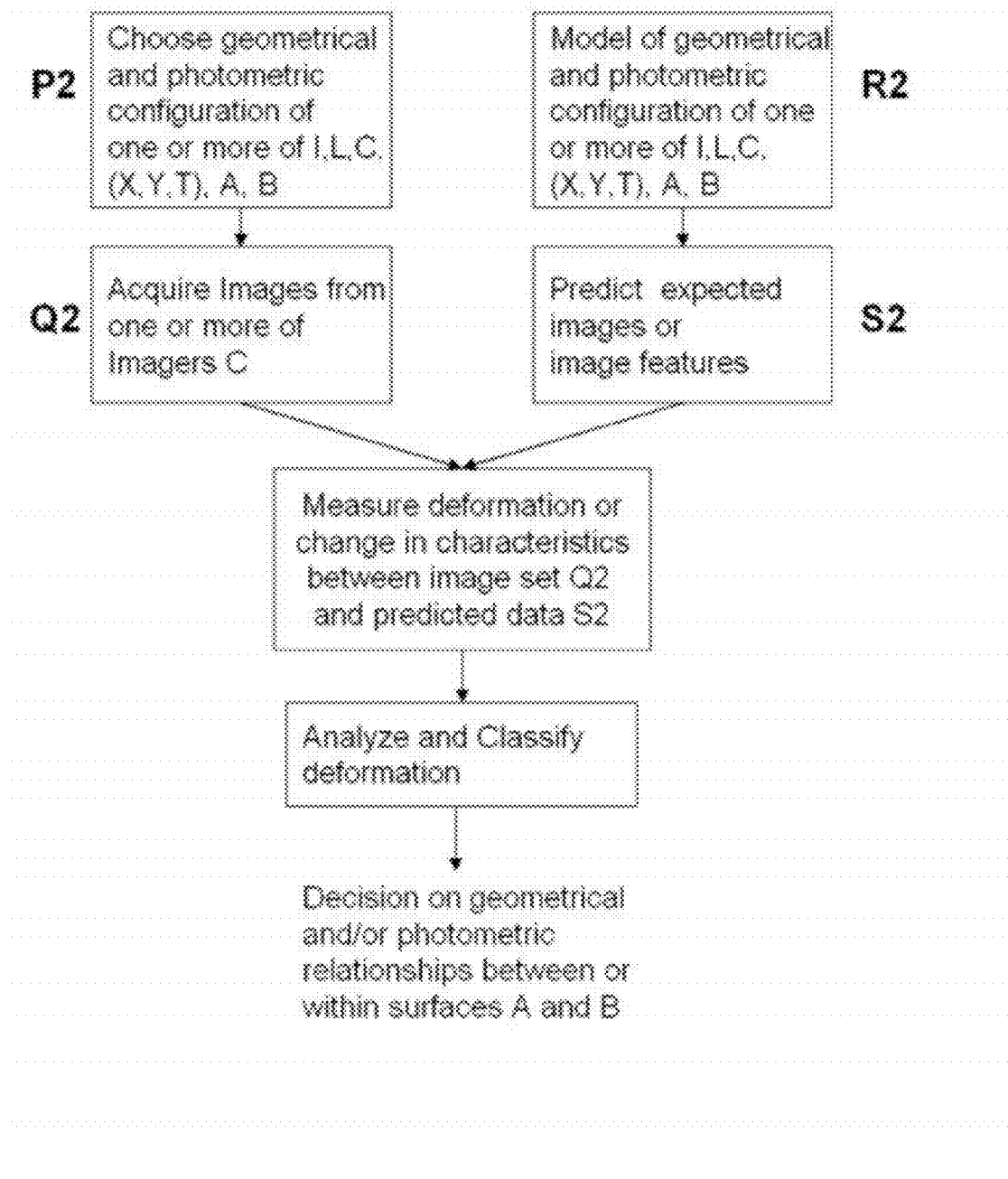
FIG. 3 is a flow chart showing another preferred method of detecting a human eye.

To illustrate an example of the second method, consider that the shape of the cornea results in a particular reflection onto the camera. For example, an image projected on the screen of computer L may be rectangular, but if the candidate corneal surface is convex then the image captured by imager C comprises a particular non-rectangular shape, that can be predicted from, for example, the ellipsoidal model described earlier in this specification. This particular reflected shape can be measured using methods described below, and can be used to determine whether the cornea has a particular shape or not. FIG. 3 shows the steps of the second method. The second method can be implemented in several ways, and the components for one approach were described above. That approach comprises the first step of projecting a random graphic pattern on a computer screen, which may optionally be pre-deformed such that the reflected image off the cornea is substantially free of deformation. The second step is then to perform pattern recognition on the image to detect the reflected graphic pattern. The expected radius of curvature of the cornea is used to compute the expected deformation and expected magnification as described above. An eye is determined to be live if the random pattern is detected at approximately the correct size and with the expected deformation. A method for performing the detection of the pattern was described above.

To illustrate the combination of the first and second methods, consider the previous example but also consider that the projected image L changes over time. Both the absolute comparison of the reflected image with the expected absolute reflection as well as the change over time in the reflected image compared to the expected change over time can be performed to validate the geometrical relationship and/or photometric relationship between or within the corneal and iris or retinal surfaces.

Optimizing Performance:

As set forth above, the number and configuration of the various system components that include (I,L,C,A,B,(X,Y,T)) can vary widely, and the methods are still capable of determining the parameters of the geometrical and/or photometric relationship between or within either surface A,B which are the corneal and iris or retinal surfaces. In order to optimize the particular configuration of the various system components, many factors in the optimization need to be included, for example: cost, size, and acquisition time. Depending on these various factors, an optimal solution can be determined. For example, consider an application where only one camera C can be used, the candidate corneal surface A and iris or retinal surface B is fixed, and only a projected light source from a computer L can be used. Using the first method, variation in the configuration may be derived from the remaining configuration parameters (X,Y,T) and L. For example, the surfaces may move in space and time, and imagery captured. In another example where the orientation and position of the eye (X,Y) is fixed, then the projected image L can be varied, and imagery acquired by camera C. Note that variation in all parameters can be performed simultaneously and not just independently. All variations provide supporting evidence about the parametric relationship between or within the corneal and iris/retinal surfaces that is used to determine whether an iris is live or not. If any one of the measured variations does not equal the expected variation, then the iris is not live.

As mentioned above, it is well known that imagery of the iris can be reliably matched to previously recorded iris imagery in order to perform reliable verification or recognition. However since the iris patterns are not easily recognizable to a human, it is impossible to demonstrate to a user who has been rejected from any iris recognition system the reason for the rejection. On the other hand, if a face recognition system is used instead of an iris recognition system, it is easy to demonstrate the reason for rejection since face imagery can be easily interpreted by humans. However, automated face recognition systems are widely known to be much less reliable than iris recognition systems.

We propose a method whereby iris imagery is acquired and used for automatic iris matching, face imagery is acquired at least for the purposes of human inspection generally in the case of rejection, and where the face and iris imagery is acquired and processed such that it is known that the face and iris imagery were derived from the same person. We present a design methodology and identify particular system configurations, including a low-resolution single camera configuration capable of acquiring and processing both face and iris imagery so that one can confirm and corroborate the other, as well as give assurances to the user who cannot properly interpret an iris image. We first present a single-sensor approach.

Single-Sensor Approach

Most methods for acquiring images of the face or iris use camera imagers. The simplest method for acquiring imagery of the face and iris with some evidence that the imagery is derived from the same person is to capture a single image of the face and iris from a single imager. However, in order to capture the face in the field of view, the number of pixels devoted to the iris will be quite small, and not typically sufficient for iris recognition. High resolution imagers can be used, but they are expensive and not as widely available as low-cost consumer cameras. Also, the albedo (reflectance) of the iris is typically very low compared to the face, and this means that the contrast of the iris is typically very small in cases where the full face is properly imaged within the dynamic range of the camera. It is generally much more difficult to perform reliable iris recognition using a low-contrast image of the iris. It is also more difficult to implement reliable anti-spoofing measures for iris recognition when the acquired data is low resolution or low contrast.

We propose a method whereby multiple images of the face and iris are collected, the images are processed, and a determination is made as to whether the face and iris images are part of an expected sequence of images. If a determination can be made that the images were collected as part of an expected sequence of images, then a determination can be made that the face and iris imagery are of the same person. The multiple images may be collected under different imaging conditions, for example: change in the midpoint of the camera's dynamic range; change in position of the user; and/or change in zoom of the camera.

Figure 4:
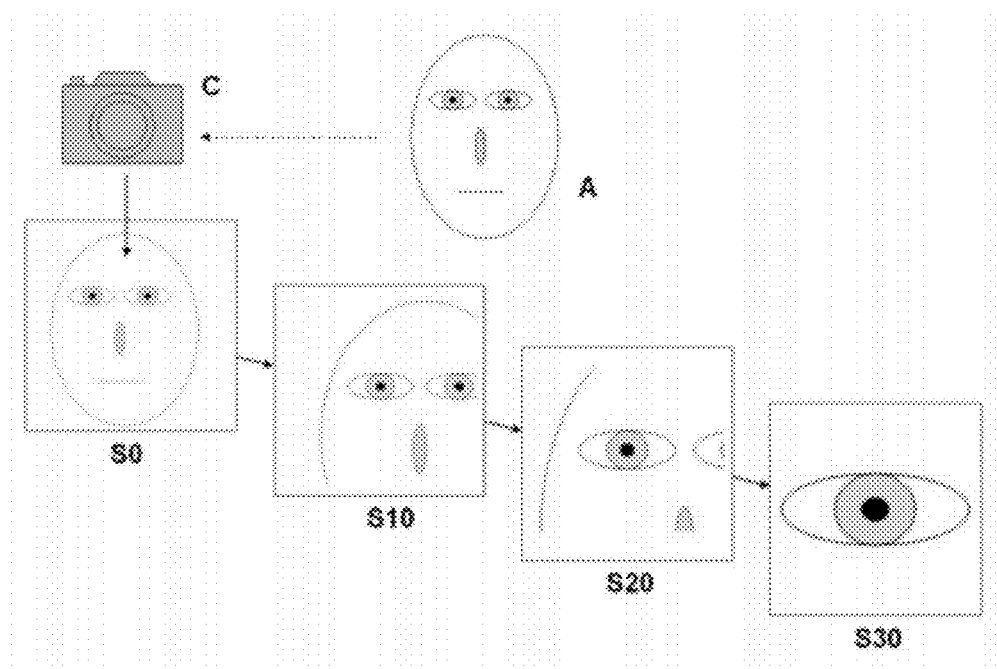
FIG. 4 is a sequential schematic diagram illustrating a biometric recognition method that associates an iris image with a face image in accordance with an embodiment of the invention.

For example, FIG. 4 illustrates the second and third scenarios. A user "A" may present themselves to a simple consumer web-camera "C". As the user moves towards or away from the web-cam, images of the face and iris are acquired. S0,S10,S20,S30 are example images from the acquired sequence. When the user is close to the web-cam, then the iris is imaged optimally. The resolution and contrast of the iris will be substantial which is helpful to optimize recognition, and also makes anti-spoofing measures easier to implement. When the user is far from the web-cam, a full face image will be acquired.

Associating Face and Iris Imagery

Figure 5:
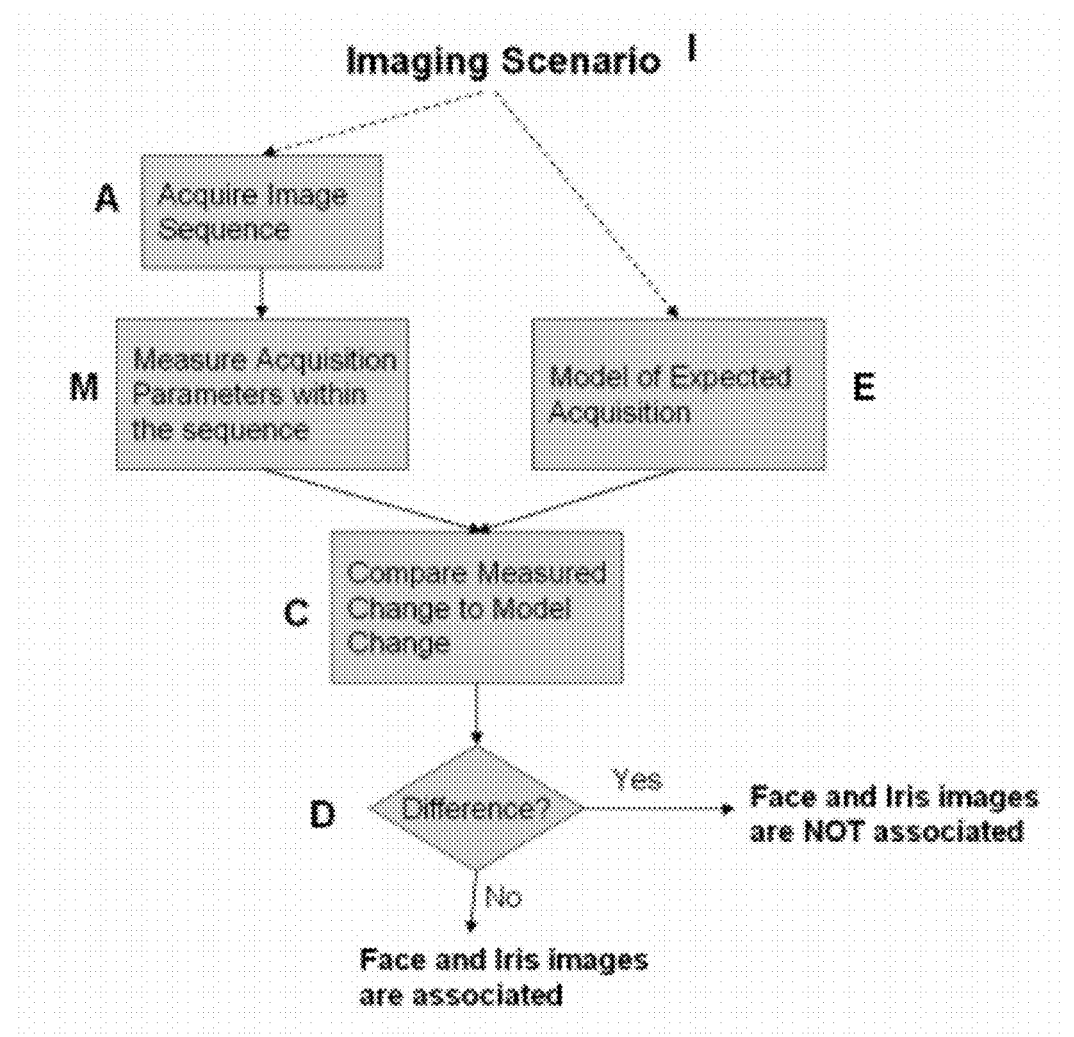
FIG. 5 is a flow chart illustrating a method for associating face and iris imagery in a sequence in accordance with an embodiment of the invention.

We now describe a method for associating face and iris imagery in a sequence. FIG. 5 shows the approach. The first step is to have knowledge of the expected imaging scenario "I". For example, in the example above, the expected imaging scenario is that the user will approach or move away from the camera (as shown, for example, in FIG. 4). Next, the image sequence is acquired as shown in step A. Next, image processing is performed between the images in the sequence to produce parameters as shown in step M. For example, continuing with the example above, motion can be computed between frames and a similarity (zoom, translation, rotation) model of motion can be fit. The expected set of parameters is derived in step E using knowledge of the imaging scenario. For example, we would expect to see a substantial zoom component in the motion analysis parameters as the user approaches or moves away from the camera, and we would expect there to be a continuous single motion and not two motions. For example, if the user tried to insert a picture of a second person into the camera's field of view as they moved away from the camera, then two motions would be present— one due to the user moving back, and the second from the insertion of the picture into the view. The measured and expected parameters are then compared in step D. If there is a significant difference between the expected and measured parameters, then the face and iris imagery cannot be associated. If there is not a significant difference, then the face and iris imagery can be associated.

It is important that the method track and perform alignment from the image at or close to the iris image used for biometric recognition to another image taken later or earlier in the sequence of images. Ideally but not necessarily, image tracking would be from the actual image used for iris matching. However, using the very same image used for iris matching is not required. The key constraint is that the iris image at or near the matched iris image has to be close enough in time to prevent a user from suddenly switching the camera from one person to the next, or from inserting a picture of someone else's iris or face, without detection. If the frame rate were as low as 0.5 Hz, then it is plausible to see that this could happen. A preferred time interval between frames is thus 2 seconds or less.

The image acquiring process of the method must include acquiring an iris image suitable for biometric recognition. The determination of what constitutes a suitable image can be made automatically by known methods. Once that suitable iris image has been determined to have been acquired, as mentioned above, tracking and alignment must be performed between at least that iris image (or a nearby image in the sequence) and another image, e.g., the image at the other end of the sequence where the iris image is at one end. The other image is described as being preferably an image of the user's face, however it need not be so limited. The other image used for tracking an alignment could be an image of the whole body of a person, a place, a face, an ID number on a wall, or pretty much anything that allows for confirmation of the user's iris image in a manner that is perceptible to the human eye. The selection of that other image can be accomplished in one or more of several ways. For example, it could be selected manually (e.g., by a button press holding the device far away or at a target), and then the end of the sequence (where the iris imagery is acquired) is detected automatically. as another example, it could also be selected via an automatic face finding algorithm, or an automatic symbol detection algorithm. The selection can also be made using the zoom difference between a face image and an iris image, since if an iris image is selected, then taking an image at least 10 times zoomed out and in the same location will result in the face.

Regarding this last method, if an iris image is selected, one can be sure there is a face in the image without doing processor-intensive face finding if the zoom and position parameters of images in the sequence are examined. If the position hasn't moved by more than the field of view of the camera, and the zoom is a certain amount, then the face is surely in the field of view. Put another way, if there are N pixels across the iris when matched (the ISO standard for N is in the range of 100 to 200 pixels), and P pixels between the eyes in the face image are desired (also 100-200 pixels, per ISO standards), then we wait until the zoom difference measured is approximately 10, since the ratio of the typical iris to the typical eye separation is about 10.

Example Implementation Methods

There are many methods for performing steps M,E,C,D in FIG. 5. We present a preferred set of methods as an example. First, if the images acquired in step A are labeled I1,I2,I3,I4 etc., then a difference image sequence D1,D2,D3,D4 is computed by subtracting adjacent frames. For example, D1=I2−I1, and D2=I3−I2 etc. If the camera sensor is stationary, then this differencing removes the background from processing meaning that all resultant intensities in the sequence are due to the moving person. Note that this approach is only used if only the user is moving. In cases of a lens that zooms, this step would not be performed since the background also moves. Second, flow analysis is performed between successive image pairs. There are many methods known in the art for performing flow analysis. An example is Bergen et. al, "Hierarchical Motion Analysis", *European Conference on Computer Vision,* 1992. We compute both flow values and also confidence measures in the flow at each location in the image for each image pair consisting of a reference and an inspection image. Third, we fit a similarity transform (translation, zoom and rotation) model to the recovered flow vectors, accounting for the confidence values using a lest-squares model-fit method. For example in the case of a moving user, regions due to the background have zero confidence since there are no intensities due to the use of the first image differencing step. A RANSAC fitting algorithm that is robust to outliers can be used [M. A. Fischler, R. C. Bolles. Random Sample Consensus: A Paradigm for Model Fitting with Applications to Image Analysis and Automated Cartography. Comm. of the ACM, Vol 24, pp 381-395, 1981]. Fourth, once the model has been fit, we warp the inspection image to the reference image using the model and compute the residual misalignment or difference between the warped image and the reference image. For example, we can re-compute the flow analysis between the warped image and the reference image. Any motion that is inconsistent with a person moving towards or away from the camera (such as the motion from a person's picture being inserted into the sequence) will be measured. We then histogram the magnitudes of these residual intensities, and repeat the entire process for every successive image pair in the sequence. For additional sensitivity, we also repeat the motion analysis between non-adjacent image pairs using the computed cascaded motion parameters between frames as a seed to begin the motion analysis. Finally, we inspect the histogram of the residual motions or differences. If there are any residual motions or differences above a threshold value, then we declare that the face and iris imagery cannot be associated.

In addition, we can use the recovered model parameters to ensure that a face image has actually been acquired. For example, an iris finder algorithm may have located the iris precisely. The motion parameters from the model-fitting process defined above can be cascaded in order to predict whether a full face image is in fact visible in any part of the sequence by predicting the coverage of the camera on the person's face for every image with respect to the location of the iris. For example, we may measure a translation T and a zoom Z between an image containing the iris at location L and a second image. We can then predict the face coverage on the second image using the parameters T,Z and L and the typical size of a person's head compared to their iris. For example, an iris is typically 1 cm in diameter and a person's head is typically 10 cm in diameter. A zoom factor of approximately 10 between the iris image and the second image will indicate that the second image is at least at the correct scale to capture an image of the face. The translation parameters can be inspected similarly. This inspection method can also be used to stop the acquisition process given an initial detection of the iris.

Multi-Sensor Approach

Figure 6:
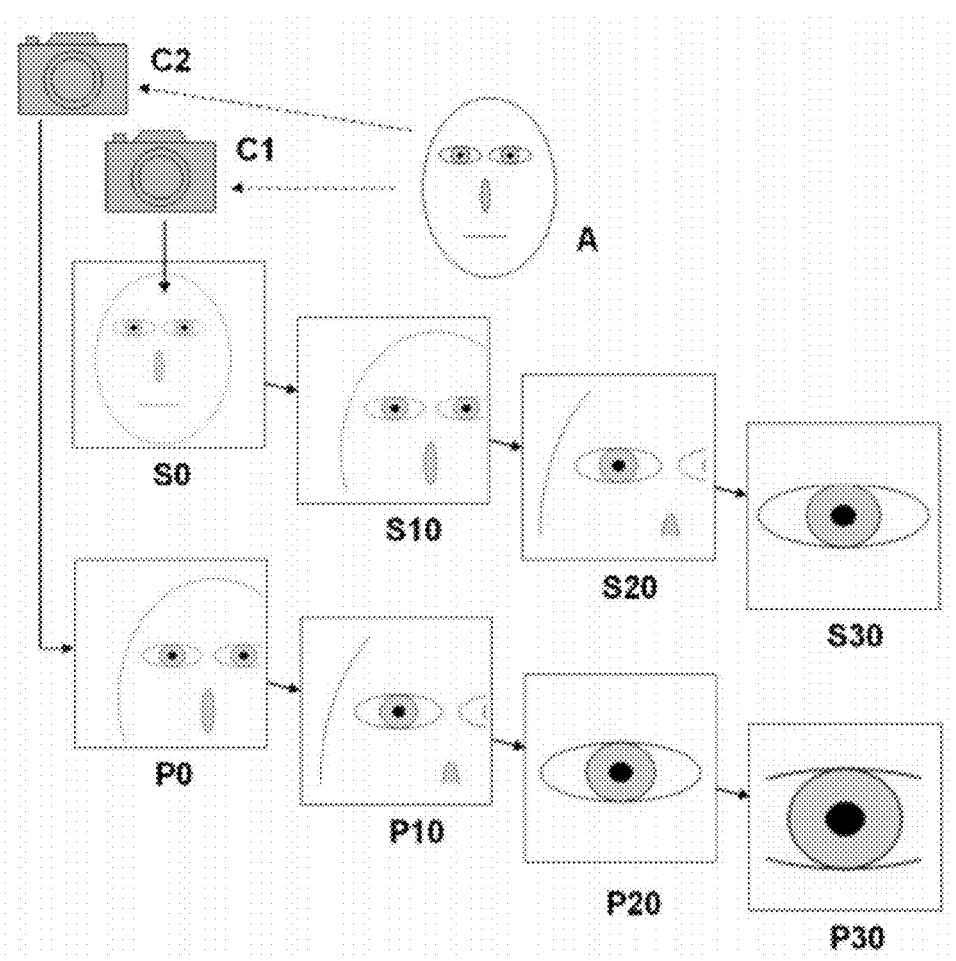
FIG. 6 is a sequential schematic diagram illustrating a biometric recognition method that associates an iris image with a face image using multiple sensors in accordance with an embodiment of the invention.

The single-sensor approach above can be extended to the use of multiple sensors. For example, FIG. 6 shows two sensors focused on a person.

One imager may have higher resolution than the other. We now can perform image processing both within a single sequence and also between the two sequences. For example, if one imager is low resolution and the second imager is high resolution, then the parameters of motion recovered from each image sequence using the methods described above will be directly related—for example if the imagery moves to the right in the low-resolution imager, then the imagery will move to the right at a faster speed in the second imager. If this does not occur, then the imagery being sent from each imaging device are likely not derived from the same person. This is important in non-supervised scenarios where video connections to the two sensors may be tampered with. In addition to comparison of motion parameters between sequences, images themselves can be compared between sequences. For example, if the approximate zoom factor between the high and low resolution cameras is known, then the high resolution image can be warped to the resolution of the low resolution image, and an image correlation can be performed to verify that the imagery from the two or more sensors are in fact derived from the same scene.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The summary, specification and drawings are, accordingly, to be regarded in an illustrative rather than a restrictive sense.

What is claimed is:

1. A method of biometric recognition, comprising the steps of:
    acquiring, by an image-capturing device, at least one image of a face and at least one image of an iris of an individual;
    determining at least one imaging parameter from the images;
    comparing the at least one imaging parameter determined from the images to at least one predetermined expected imaging parameter, wherein if the at least one imaging parameter determined from the images is significantly different from the at least one predetermined expected imaging parameter, then it is determined that the images do not form an expected sequence, said comparing step comprising determining if accumulated motion vectors of the images is consistent with an expected set of motion vectors, said comparing step performed at the same time as the acquiring step, wherein if said comparing step detects inconsistent accumulated motion vectors, the acquiring step is ceased and an error message is generated; and if the images are determined to form an expected sequence, associating the face and iris images together.

2. A method of biometric recognition according to claim 1, wherein if the face and iris images are associated together, further comprising the step of comparing at least one of the iris images to a stored iris image in a database.

3. A method of biometric recognition according to claim 2, wherein said iris image comparing step is performed automatically by a computer.

4. A method of biometric recognition according to claim 2, wherein if the face and iris images are associated together, further comprising the step of comparing at least one of the face images to a stored face image in a database.

5. A method of biometric recognition according to claim 4, wherein said face image comparing step is performed manually by a human.

6. A method of biometric recognition according to claim 1, wherein said acquiring step is performed by a single sensing device.

7. A method of biometric recognition according to claim 6, wherein the single sensing device is a camera and said acquiring step further comprises the step of taking multiple images of a person's face.

8. A method of biometric recognition according to claim 7, said acquiring step further comprising the step of changing a midpoint of the camera's dynamic range while taking the multiple images of the person's face.

9. A method of biometric recognition according to claim 7, said acquiring step further comprising the step of changing the position of the user relative to the camera while taking the multiple images of the person's face.

10. A method of biometric recognition according to claim 7, said acquiring step further comprising the step of changing the zoom of the camera while taking the multiple images of the person's face.

11. A method of biometric recognition according to claim 7, wherein said image-taking step occurs at a frame rate of at least 0.5 Hz.

12. A method of biometric recognition according to claim 1, wherein said acquiring step is performed until at least one face image suitable for human recognition is acquired and at least one iris image suitable for computer recognition is acquired.

13. A method of biometric recognition according to claim 12, further comprising the step of requiring the acquisition of the at least one suitable face image to occur within a predetermined amount of time of the acquisition of the at least one suitable iris image.

14. A method of biometric recognition according to claim 12, further comprising the step of requiring the acquisition of the at least one suitable face image to occur within a predetermined amount of time of the acquisition of the at least one suitable iris image.

15. A method of biometric recognition, comprising the steps of:
    acquiring, by an image-capturing device, at least one image of a face and at least one image of an iris of an individual;
    determining at least one imaging parameter from the images;
    comparing the at least one imaging parameter determined from the images to at least one predetermined expected imaging parameter, wherein if the at least one imaging parameter determined from the images is significantly different from the at least one predetermined expected imaging parameter, then it is determined that the images do not form an expected sequence, said comparing step comprising ensuring that the iris remains in the field of view of the images, said comparing step performed at the same time as the acquiring step, wherein if said comparing step detects that the iris is not in the field of view of the images, the acquiring step is ceased and an error message is generated; and
    if the images are determined to form an expected sequence, associating the face and iris images together.

16. A method of biometric recognition according to claim 15, wherein if the face and iris images are associated together, further comprising the step of comparing at least one of the iris images to a stored iris image in a database.

17. A method of biometric recognition according to claim 16, wherein said iris image comparing step is performed automatically by a computer.

18. A method of biometric recognition according to claim 15, wherein if the face and iris images are associated together, further comprising the step of comparing the at least one face image to a stored face image in a database.

19. A method of biometric recognition according to claim 18, wherein said face image comparing step is performed manually by a human.

20. A method of biometric recognition according to claim 15, wherein said acquiring step is performed by a single sensing device.

21. A method of biometric recognition according to claim 20, wherein the single sensing device is a camera and said acquiring step further comprises the step of taking multiple images of a person's face.

22. A method of biometric recognition according to claim 21, said acquiring step further comprising the step of changing a midpoint of the camera's dynamic range while taking the multiple images of the person's face.

23. A method of biometric recognition according to claim 21, said acquiring step further comprising the step of changing the position of the user relative to the camera while taking the multiple images of the person's face.

24. A method of biometric recognition according to claim 21, said acquiring step further comprising the step of changing the zoom of the camera while taking the multiple images of the person's face.

25. A method of biometric recognition according to claim 21, wherein said image-taking step occurs at a frame rate of at least 0.5 Hz.

26. A method of biometric recognition according to claim 15, wherein said acquiring step is performed until at least one face image suitable for human recognition is acquired and at least one iris image suitable for computer recognition is acquired.

* * * * *